Dec. 19, 1944.  S. F. ALEXANDER  2,365,163
EYEGLASSES
Filed Oct. 15, 1942
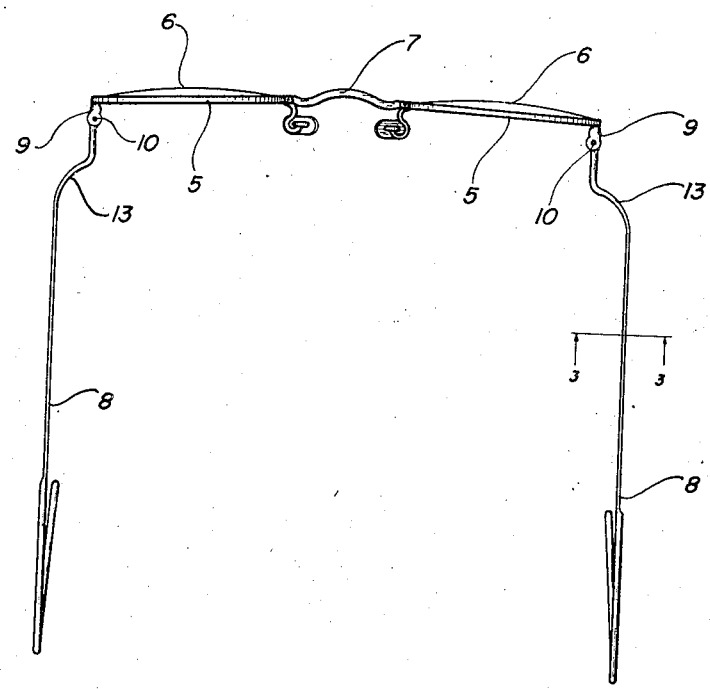
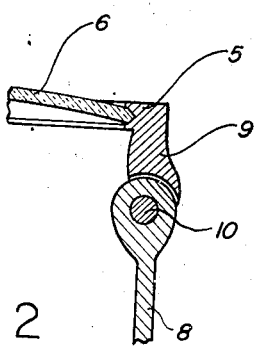
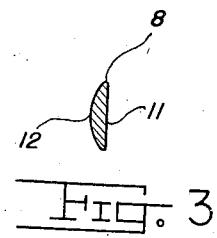
Inventor
STEWART F. ALEXANDER Patented Dec. 19, 1944

2,365,163

UNITED STATES PATENT OFFICE 2,365,163

EYEGLASSES

Stewart F. Alexander, United States Army

Application October 15, 1942, Serial No. 462,188

5 Claims. (Cl. 88—41)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to eyeglasses or spectacles of the type referred to as "corrective spectacles," and particularly to spectacles of the mentioned variety that embody a lens frame and bows or temples hinged to the lens frame.

The invention has particular reference to the construction of corrective spectacles for the purpose of greater convenience, comfort, and safety to wearers when called upon to don gas masks for protection against irritant and noxious gases encountered in chemical warfare and, at times, in industry.

The need for a satisfactory form of vision-improving and correcting eyeglass or spectacle structure to be used with gas masks has been apparent for some time. Various attempts have been made to solve the problem encountered. Such proposals involve either altering the gas mask for bespectacled individuals, or attaching corrective lenses to the gas mask eye pieces, or replacing the gas mask eye pieces with corrective lenses. However all of these efforts have been found deficient in one or more respects.

The object of the present invention is to provide in a commercially practical form an eyeglass or spectacle frame and temple structure and assembly suitable for wear both with and without a gas mask, and characterized by head engaging bow or temple members which are so constructed, shaped, and hingedly connected with the frame as to offer no obstructions or projections as might be contacted by the facepiece incidental to the donning or removal of the gas mask resulting in displacement of the spectacle, and which will so contact the head of the wearer that they will not in any wise adversely affect the sealing-contact as is now generally and advantageously effected between the skin of the wearer and the peripheral edge of the facepiece of a modern gas mask.

The invention, together with its objects and advantages, will be best understood from a study of the following description, taken in connection with the accompanying drawing, wherein:

Figure 1 is a top plan view of a pair of eyeglasses illustrating the application of this invention.

Figure 2 is an enlarged, fragmentary detailed sectional view through the hinge joint between a temple and the lens-carrying frame.

Figure 3 is a transverse sectional view taken substantially on the line 3—3 of Figure 1 and looking in the direction of the arrows.

The invention is illustrated as applied to a pair of eyeglasses or spectacles comprising a frame embodying lens frames 5, 5, accommodating prescription or corrective lenses, 6, 6, a nose bridge 7, and bows or temples 8, 8. While the lens frames 5, 5 are herein illustrated as being of the closed ring type, it is within the scope of the invention to employ lenses of the customary rimless type, the frame for which is characterized by rim braces, such as shown, for example, in the U. S. Patent 2,197,682.

As is well known, it is customary, both in the form of frame herein illustrated and in that form of frame shown in the aforesaid Patent No. 2,197,682, to provide rigid temple arms or hinge members to which are pivoted the bows or temples. These simple arms or hinge members in prior art structures project radially outward with respect to the lens rims, presenting projections difficult to avoid in donning or removing the face piece of a modern gas mask. As a consequence they offer serious obstacles to the rapid application and removal of the gas mask.

In accordance with this invention the temple arms or rigid hinge members, herein indicated by the reference numerals, 9, 9, project rearwardly, being securely fastened to the posterior surfaces of the lens frames, 5, 5 as by being integral therewith, or in any other suitable manner. Hence these arms or hinge members lie substantially wholly within the confines of the frame peripheries, and thus neither offer an obstacle as will interfere with the donning or removal of the gas mask facepiece, nor present projections as might be contacted incidental to the manipulation of the facepiece and result in displacement of the spectacle from proper position on the wearer.

A salient feature of the invention is in having the temples or bow members which are hinged to the temple arms 9 by pins 10, provided with head contacting shank portions that are of a cross-sectional shape for the entire portion of the length thereof that contacts with the head that will insure against leakage of the gas mask in the region of the point of contact with the material of the face piece with the temples 8, as illustrated. The head contacting portions of the temples or bows 8, 8 have flat outer surfaces 11, while the inner or skin contacting surfaces, 12 thereof are rounded transversely of the length of the temples or bow members.

It is contemplated that in fitting the spectacles to the wearer the temples 8, 8 will be sprung in a manner to cause the same, by reason of the inherent spring tension thereof, to press firmly but not irritatingly against the head of the wearer in a manner to urge the convex sides of the temples to press into or indent the skin of the wearer to an extent sufficient to bring the flat surfaces 11, 11 of the temple members flush with the surface of the skin of the wearer and to form therewith, and at the point of contact between the temple members and the head, a smooth unbroken suface. As a consequence the noxious gas-excluding seal which the peripheral edge of the gas mask facepiece, as now known and constructed, makes with the skin of the wearer will remain unbroken, or in other words, just as effective a seal will be made between the skin-contacting peripheral edge of the facepiece and the skin of the wearer when the glasses or spectacles are worn, as is now obtained when the gas mask is worn without the wearer being equipped with spectacles. The advantage therefore of this particular cross sectional shape of the head-contacting portions of the temples 8, will be readily appreciated by those familiar with the art of gas masks.

The temple pieces are constructed from readily pliable and bendable material, so as to be easily altered along the longitudinal, vertical and/or saggital axes as may be required in order to have the temple pieces contact the head in the manner above described so as not to interfere with the air-excluding seal normally formed by contact of the peripheral edge of the gas mask facepiece with the skin of the wearer.

By virtue of the malleability thereof, the temples 8, 8 may be readily bent or offset at the pivoted or hinged ends thereof, and as suggested in the drawing, to meet the requirements of the person being fitted with the spectacles. The bends 13 will also serve to maintain the temples under tension sufficient to cause the convex surfaces thereof to press into or indent the skin of the wearer as previously explained and thus cause the flat outer surfaces of the temples to be flush with the skin surface so that they will not adversely affect the desired seal formed between the skin-contacting edge of the facepiece and the skin of the wearer when the gas mask is worn.

It will also be understood that the peripheral edge contours of the prescription lenses may be varied without adversely affecting or changing the optical axes of the lenses, and as may be found desirable or expedient to insure against any undesirable interference with the gas mask, arising from the wearing of the spectacles when the gas mask is being worn. Thus, in accordance with this invention, the glasses or spectacles are readily fitted to the individual in the usual manner so that the distance between the optical centers of the two lenses coincides with the interpupillary distance in each case. The variation in interpupillary distance is effected by having various sized bridges or nosepieces, as will be appreciated by those skilled in the optical art.

It will be seen from the foregoing that corrective glasses may be worn with gas masks without discomfort, without adversely affecting the vision of the wearer, and without in any way detracting from the value of the gas mask as a safety medium and protection against noxious gases encountered either in chemical warfare or in industry. Also use of spectacles contemplated by this invention obviates the need of either altering the gas mask for bespectacled persons, or attaching corrective lenses to the gas mask eyepieces, or the replacing of the gas mask eyepieces with corrective lenses.

While there is herein illustrated and described what is considered to be the preferred embodiment of the invention, it will be understood that the specific details herein disclosed are for purposes of illustration and are not to be deemed restrictive.

Having thus described the invention, what is claimed is:

1. Spectacles comprising a frame embodying a pair of lens-carrying portions, and temples pivoted at one end to said lens-carrying portions; each of said temples having a head-contacting shank having a flat outer surface and a convex inner skin-contacting surface for the full length of the shank, said shanks being of such thickness that when the spectacles are being worn and the shanks are pressing into the wearer's head said flat outer surfaces of the shanks will be substantially flush with the wearer's skin.

2. Spectacles comprising a frame embodying a pair of lens-carrying portions, temple arms rigidly mounted on the lens-carrying portions and extending rearwardly therefrom, temples pivoted at one end thereof to said temple arms, and each of said temples having a head-contacting shank of cross-sectional shape presenting a flat outer surface and a transversely curved inner skin-contacting surface, said shanks being of such thickness that when the spectacles are being worn and the shanks are pressing into the wearer's head said flat outer surfaces of the shanks will be substantially flush with the wearer's skin.

3. Spectacles comprising a frame embodying a pair of lens-carrying portions, temple arms rigidly mounted on the lens-carrying portions and extending rearwardly therefrom, temples pivoted at one end thereof to said temple arms, and each of said temples having a head-contacting shank of cross-sectional shape presenting a flat outer surface and a transversely curved inner skin-contacting surface; said shanks being of such thickness that when the spectacles are being worn and the shanks are pressing into the wearer's head said flat outer surfaces of the shanks will be substantially flush with the wearer's skin, and said temples being of resilient and bendable material so as to provide bends at the pivoted ends thereof for placing the temples under tension to maintain pressure contact of the temple shanks with the head of the wearer.

4. Spectacles for wear with a gas mask characterized by temple members each of which has a head-contacting shank having a cross-sectional shape, presenting a transversely curved inner skin-contacting surface and a flat outer surface and also having such a thickness, whereby when the temples are in pressure contact with the head, said flat outer surfaces are flush with the skin surface of the wearer in a manner non-interfering with the usual sealing contact of the gas mask facepiece with the skin of the wearer.

5. Spectacles of the type embodying a lens frame, temple arms rigidly mounted on the lens frame, and temples pivotally secured at one end to said temple arms, and designed for wear with a gas mask, characterized by having the hinge connections between the temples and the arms located rearwardly of the frame and inwardly from the peripheries of the lens-accommodating portions of said frame, and further characterized by having each temple provided with a head-contacting shank of cross-sectional shape presenting a flat outer surface and an inner skin-contacting convex surface said shanks being of such thickness that when the spectacles are being worn and the shanks are pressing into the wearer's head said flat outer surfaces of the shanks will be substantially flush with the wearer's skin.

STEWART F. ALEXANDER.